Figure 1:
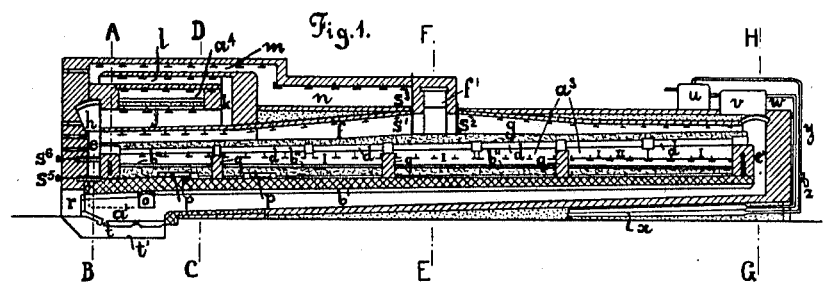
Figure 2:
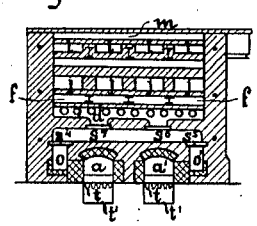
Figure 3:
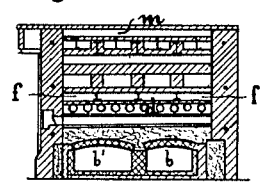
Figure 4:
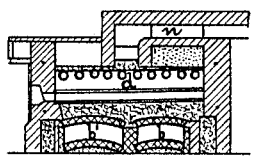
Figure 5:
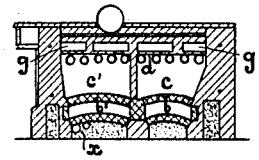

F. VERMEULEN.
BAKING OVEN.
APPLICATION FILED JUNE 22, 1911.

1,019,862.

Patented Mar. 12, 1912.

2 SHEETS—SHEET 1.

Witnesses
Fred* R. Curtice.
Joseph F. Sullivan

F. Vermeulen
Inventor
by Graydon Marks
Attorney

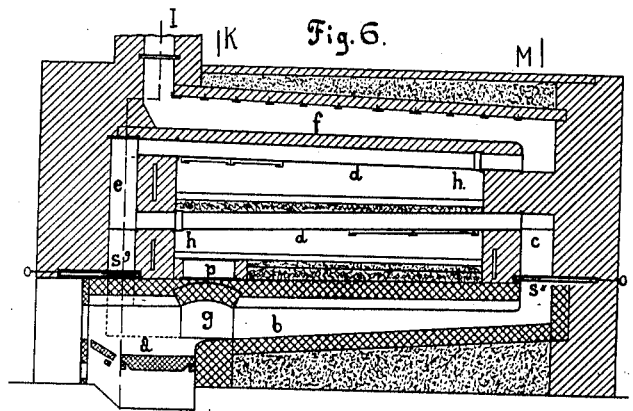
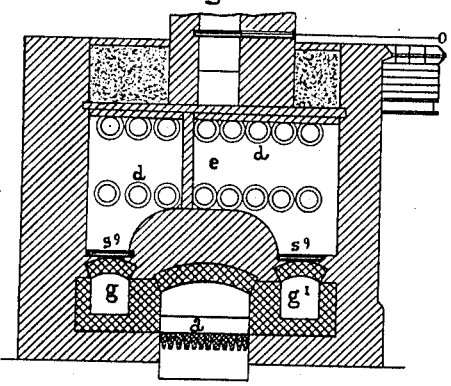
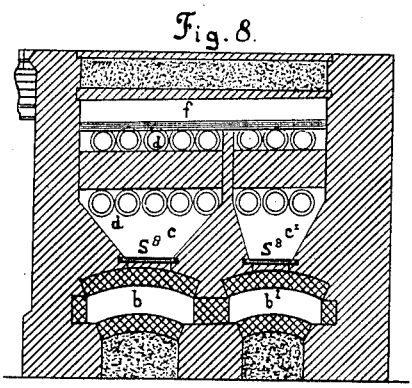
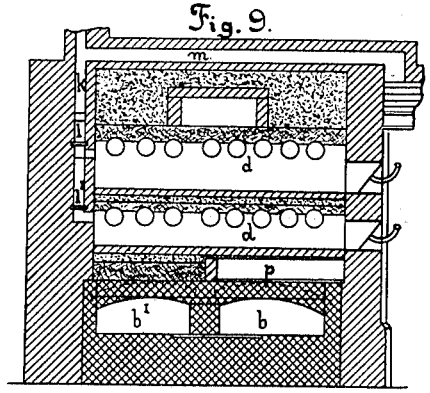

UNITED STATES PATENT OFFICE.

FREDERIK VERMEULEN, OF AMSTERDAM, NETHERLANDS, ASSIGNOR TO MAATSCHAPPIJ HOLLAND NAAMLOOZE VENNOOTSCHAP TOT INSTALLATIE VAN BAKKERIJEN, OF AMSTERDAM, NETHERLANDS.

BAKING-OVEN.

1,019,862.

Specification of Letters Patent. Patented Mar. 12, 1912.

Application filed June 22, 1911. Serial No. 634,774.

*To all whom it may concern:*

Be it known that I, FREDERIK VERMEULEN, a subject of the Queen of the Netherlands, and resident of Frederik Hendrikstraat 15, Amsterdam, Netherlands, have invented a certain new and useful Improved Baking-Oven, of which the following is a specification.

This invention relates to baking ovens of the type possessing a plurality of superposed baking compartments each capable of being separately heated.

In large bakeries a number of separate ovens are installed each separately heated, in order to provide the necessary number of baking compartments and in consequence each compartment requires separate attention which causes high labor expenses without completely utilizing the space at disposal or the available heat. Attempts have been made to make a better utilization of the available ground area by arranging the baking ovens with one or more superposed and separately heated baking compartments. In baking ovens of this type the heating ducts were arranged transversely to the baking compartments and partially led through these in the form of pipes. In such baking ovens it was however, difficult to attain an exactly regulated heating of the back and front halves of the baking compartments even in the case of small ovens, while in large ovens such regulation was out of the question. A uniform heating which can be regulated at will is however necessary especially in the baking of bread unless the work of baking is to be rendered unnecessarily slow and difficult.

According to the present invention the main heating ducts which pass transversely above and below the baking compartments are again transversely divided and each provided with one or more fires according to requirements so that the front and back halves of the baking compartments can have their heating regulated to any desired extent independently of each other. In order to attain a uniform and thorough heating even in the direction of the issuing ends of the heating ducts, the pipes are inclined toward the floor of the oven toward the end. To enable any baking compartment to be put out of use the pipes are connected to a fire duct leading into the chimney. The heating gases may thus be conducted either through the pipes and the one half, or only through the other half of the upper duct.

According to the invention the oven is so arranged that the fire for all the baking compartments is located at one side of the oven and the heating of the compartments is effected by means of ducts extending transversely below and above the same. The heating gases from the fire first pass through the duct below the oven floor from which they pass into ducts in the form of pipes which extend transversely through the baking compartments, whence the gases pass into a duct located in the wall above the compartments, into the discharge duct. When there are several baking compartments arranged one behind the other the arrangement is preferably such that the heating gases can pass through either the pipe duct or the upper duct in the wall as required so that the heat can be modified to suit the goods being baked at the time. In smaller ovens with superposed baking compartments the pipe duct passing through the lower baking compartment may simultaneously serve for the heating of the floor of the compartment above. Such a construction of the oven has the great advantage that the heating can be located outside of the bakery which is of great importance in the interests of cleanliness. The oven is moreover, easier and simpler to handle than a number of separate ovens so that there is a saving in wages and labor. Owing, moreover, to the long duct extending above and below the baking compartments the heat of the gases is fully utilized. By arranging slide plates at suitable positions the heating gases can be so controlled that the desired heat is developed in all the compartments.

In the accompanying drawings, Figure 1 is a longitudinal section of an oven suitable for work on a large scale. Figs. 2–5 are transverse sections on the lines A—B, C—D, E—F, G—H in Fig. 1. Fig. 6 is a longitudinal section of an oven suitable for work on a small scale or for pastry, and Figs. 7–9 are transverse sections on the lines I—J, K—L and M—N in Fig. 6.

The ovens are provided with several baking compartments $a^3$ the number being four in the example illustrated in Fig. 1, these compartments being separated by transverse walls $q$. The compartments are heated by ducts $b$, $b'$ extending transversely underneath their floors, which ducts are connected to the laterally arranged fire places $a$, $a'$. The ducts $b$, $b'$ gradually rise and are slightly tapered toward their ends. Through the compartments pass ducts $b$ in the form of pipes, which ducts are connected through lateral rising channels $c$, $c'$ with the ducts $b$, $b'$. Above the compartments are located transverse ducts $f$ $g$ which rise toward the middle, which two ducts are connected at one end with the rising channels $c$ $c'$ or $e$ and at the other end lead into the discharge duct $f'$. At their issuing point to the discharge duct $f'$ they may be closed by means of slide plates $s^I$ $s^{II}$. The vertical channel $e$ is in direct communication with the fire place through a lateral channel $o$ and can be closed by means of slide plates $s^{IV}$, $s^V$, $s^{VI}$, $s^{VII}$ underneath the pipe duct $b$. Above one end of the oven there is provided a further baking compartment $a^4$ heated by a lower duct $j$ and an upper duct $l$ which ducts are connected by the rising channel $k$. The lower duct $j$ is connected to a chamber to the channel $e$ and can be closed by means of a slide $h$. The heating gases can pass from the upper duct $l$ into the ducts $m$ $n$ whence they escape to the discharge $f'$. A further slide plate $s^{III}$ is provided at the end of the duct $n$. By closing or opening of the different slide plates the heating gases can be caused to describe the following paths: When the slides $s^{II}$—$s^{VII}$ are closed but $s^I$ open the heating gases from the fireplaces $a$ $a'$ pass through the lower ducts $b$ $b'$, the rising channels $c$ $c'$, the pipe ducts $d$, the rising channel $e$ and the upper duct $f$ into the discharge duct $f'$. If the slide $s^I$ is closed and $s^{II}$ opened the heating gases from the rising channel $c'$ do not pass through the pipe ducts $d$ but go directly through the upper duct $g$ to the discharge duct $f'$. If $s^I$ and $s^{II}$ are closed but $h$ opened the heating gases can pass through the pipe ducts $d$, the channel $e$ and the ducts $j$, $k$, $l$, $m$, $n$ to the discharge $f'$ so that the upper compartment $a^4$ is also heated. Finally, by opening the slide $s^4$ the gases can pass directly from the fire place through the channel $o$ into the channel $e$. According as the different slides are more or less opened the baking compartments can be heated more or less strongly as required. It has been found in practice that the back fire place for the heating of the large baking compartment is utilized only to a small extent because it loses considerably less heat by radiation than the front fire place. For this reason the former usually burns very uniformly and can be used for the heating of the upper compartment. The latter is especially suited for baking articles which require a special temperature either lower or higher than the normal. The channels $b$ $b'$ are narrowed between the fire place crown and the oven floor the farther they extend from the fire. The object of this is to attain a uniform heating.

Between the fire place crown and the oven floor are provided spaces $p$ for the reception of steam generators by means of which the steam required in the baking of certain articles may be produced. This steam is led to the various compartments as required. The complete separation from each other of the different baking compartments makes it possible that any baking compartment may be constructed in a special manner for example may be adapted for the baking of special articles by being provided with a softer floor or for the baking of fancy bread by the provision of an inclined floor.

The pipes $d$ are so inserted that their extension due to temperature changes has no influence on the oven. For this object the ends of the pipes are led through tightly mounted or screwed out and built in sleeves. The separate ducts may be formed of T-girders the formation being completed by means of brickwork. The channels $f$ and $g$ become narrowed toward the discharge duct $f'$ so that they become nearly square. The upper compartment $a^4$ may be arranged directly above the pipe duct $d$ instead of above the duct $f$, so that the channels $j$ $k$ may be omitted.

To obtain better combustion it is preferable to provide a sufficiently large pit $t'$ underneath the grate $t$, in which pit there is always some water. Below the oven bed plate is arranged a filling of sand in which a number of pipes can be embedded which pipes are connected through pipes $w$ $y$ with water vessels $u$ $v$ mounted on the oven. The vessels $u$ $v$ are preferably arranged at different heights, so that the colder water collects in the lower vessel $v$ and in consequence of its greater density sinks downward and is initially heated in the coil $x$ whence it passes upward through the pipe $y$. In this latter there may be provided a tap $z$ from which warm water may be drawn. The initially heated water can also be used for supplying the steam generators in the recesses $p$. According to the size of the oven the available heat can be utilized by providing a suitable number of pipe coils. The heated water may be used for the heating of various appliances used in a bakery such as a milk heater or may be used for the heating of the building.

The doors of the baking compartments may be mounted in different ways. For compartments having a steam supply an inwardly opening door is preferably used, hinged at the top and opened only slightly for the insertion of the articles to be baked in order to prevent the steam as far as possible from escaping. With other baking compartments a downwardly opening door may be used which constitutes in opened position an elongation of the oven floor, which greatly facilitates the insertion of the bread to be baked. For the upper baking compartments a sliding door is preferably used. T-bars are preferably used in the compartments as guides for sliding plates I, II which serve to screen off the heat coming from the pipe ducts $d$, as required.

In smaller ovens the modification according to Figs. 6–9 may be used. In this case two superposed compartments are provided through each of which passes upper pipe ducts $d$ of which the lower are connected by the rising channels $c$ $c'$ with the lower ducts $b$ $b'$ at the one end and at the other end lead into the channel $e$, while the upper pipe ducts are in direct communication through the channels $e$ and $g$ with the fire place. The channels $c$ $c'$ and $e$ may be closed as required by means of slides $s^{VIII}$ and $s^{IX}$. If the slide $s^{VIII}$ is opened the heating gases flow from the fire place $a$ through the ducts $b$ $b'$, the channel $c$, the lower duct $d$, the channel $e$, the upper duct $d$, and through the duct $f$ into the discharge duct. If the slides $s^{VIII}$ are closed, but $s^{IX}$ opened, the heating gases escape through the channels $g$ $e$ and the ducts $d$ and $f$ into the discharge duct. By suitable adjustment of the slides the heating may be so controlled that either the upper or the lower compartment bakes the faster. This modification also may be constructed as required to suit any required conditions by adding additional compartments. A recess $p$ for the reception of a steam generator may also be provided.

Having now described my invention what I claim as new and desire to secure by Letters Patent is:—

1. In a baking oven, a plurality of superposed separately heated baking compartments, main heating ducts transverse to the compartments and consisting in part of pipes, and transverse branchings in the heating ducts adapted to independently and regulably heat the front and back halves of the compartments.

2. In a baking oven a plurality of superposed separately heated baking compartments, main heating ducts transverse to the compartments and consisting in part of pipes, transverse branchings in the heating ducts adapted to independently and regulably heat the front compartments, and a fire place in one branch.

3. In a baking oven a plurality of superposed separately heated baking compartments, main heating ducts transverse to the compartments and consisting in part of pipes, transverse branchings in the heating ducts adapted to independently and regulably heat the front and back halves of the compartments, and a fire place in one branch.

4. In a baking oven, a plurality of superposed separately heated baking compartments, main heating ducts transverse to the compartments and consisting in part of pipes, transverse branchings in the heating ducts adapted to independently and regulably heat the front and back halves of the compartments and an upper fire duct communicating at the center with the discharge duct and at each end with the pipe parts of the heating ducts, these pipe parts being downwardly inclined to the baking floor toward the outlet, in the direction of the flow, for the heating gases whereby these latter may be passed as desired through either the pipe parts and one half of the upper fire duct or through the other half only.

5. In a baking oven a plurality of superposed separately heated baking compartments, main heating ducts transverse to the compartments and consisting in part of pipes, transverse branchings in the heating ducts adapted to independently and regulably heat the front and back halves of the compartments, one or more fire places in the branches, and an upper fire duct communicating at the center with the discharge duct and at each end with the pipe parts of the heating ducts, these pipe parts being downwardly inclined to the baking floor toward the outlet for the heating gases whereby these latter may be passed as desired through either the pipe parts and one half of the upper fire duct or through the other half only.

6. In a baking oven a plurality of superposed separately heated baking compartments, main heating ducts transverse to the compartments and consisting in part of pipes, transverse branchings in the heating ducts adapted to independently and regulably heat the front and back halves of the compartments, one or more fire places in the branches, an upper fire duct communicating at the center with the discharge duct and at each end with the pipe parts of the heating ducts, these pipe parts being downwardly inclined to the baking floor toward the outlet for the heating gases whereby these latter may be passed as desired through either the pipe parts and one half of the upper fire duct or through the other half only, a rising channel connecting the horizontal heating ducts, and a duct connecting the said channel to an additional baking compartment, which duct likewise terminates in the gas discharge duct.

In testimony whereof I affix my signature in presence of two witnesses.

FREDERIK VERMEULEN.

Witnesses:
J. L. GRAY,
H. Y. KOON.